(12) United States Patent
Shirai et al.

(10) Patent No.: US 7,151,621 B2
(45) Date of Patent: Dec. 19, 2006

(54) IMAGE READING APPARATUS

(75) Inventors: Masahiro Shirai, Saitama (JP); Masashi Shimamura, Saitama (JP)

(73) Assignee: Canon Denshi Kabushiki Kaisha, Chichibu (JP)

( * ) Notice: Subject to any disclaimer, the term of this patent is extended or adjusted under 35 U.S.C. 154(b) by 0 days.

(21) Appl. No.: 11/429,075

(22) Filed: May 8, 2006

(65) Prior Publication Data
US 2006/0203308 A1    Sep. 14, 2006

Related U.S. Application Data

(62) Division of application No. 10/236,966, filed on Sep. 9, 2002.

(30) Foreign Application Priority Data

Sep. 13, 2001 (JP) .............................. 2001/278668
Dec. 10, 2001 (JP) .............................. 2001/376292

(51) Int. Cl.
*H04N 1/04* (2006.01)
*B65H 5/00* (2006.01)

(52) U.S. Cl. ...................... 358/496; 358/498; 358/474; 271/10.1

(58) Field of Classification Search ................ 358/496, 358/498, 474; 271/10.1, 264
See application file for complete search history.

(56) References Cited

U.S. PATENT DOCUMENTS

| | | | |
|---|---|---|---|
| 34,948 A | 4/1862 | Aizawa et al. ................ 209/64 |
| 4,743,974 A | 5/1988 | Lockwood ................... 358/494 |
| 5,359,435 A | 10/1994 | Hayashi et al. .............. 358/498 |
| 5,761,599 A | 6/1998 | Weng et al. ................. 399/367 |
| 5,822,076 A | 10/1998 | Maruyama ................... 358/296 |
| 5,995,800 A | 11/1999 | Ahn ........................... 399/361 |
| 6,009,303 A | 12/1999 | Kumagai et al. ............ 399/370 |
| 6,055,070 A * | 4/2000 | Kang .......................... 358/497 |
| 6,285,852 B1 * | 9/2001 | Etoh et al. ................... 399/367 |
| 6,400,472 B1 | 6/2002 | Yoshimizu ................... 358/498 |
| 6,995,880 B1 | 2/2006 | Tohyama et al. ............ 358/496 |

FOREIGN PATENT DOCUMENTS

| | | |
|---|---|---|
| JP | 11-112735 | 4/1999 |
| JP | 2001-210258 | 8/2001 |

* cited by examiner

*Primary Examiner*—Twyler Lamb
*Assistant Examiner*—Houshang Safaipour
(74) *Attorney, Agent, or Firm*—Fitzpatrick, Cella, Harper & Scinto

(57) ABSTRACT

An image reading apparatus which enables the area occupied by the apparatus to be made small and can stably transport even a thick sheet having stiffness. A sheet P contained in an inclined sheet containing portion 3 is transported to image reading portions 8 and 9 by a vertically extending first sheet transporting path R1, and an image on the sheet P is read by the image reading portions 8 and 9, and the sheet P on which the image has been read is delivered to a substantially horizontal delivery stacking portion 14 by a substantially horizontally extending second sheet transporting path R2. The image reading portion 9 is provided between the vertically extending first sheet transporting path R1 and the substantially horizontally extending second sheet transporting path R2, and in the image reading portion 9, the transport direction of the sheet P passed along the first sheet transporting path R1 is changed to a direction toward the second sheet transporting path R2.

10 Claims, 14 Drawing Sheets

IMAGE READING APPARATUS

CROSS-REFERENCE TO RELATED APPLICATIONS

This application is a divisional of U.S. patent application Ser. No. 10/236,966, filed Sep. 9, 2002, and claims benefit of the filing date of that application, and priority benefit of the filing dates of Japanese patent applications nos. 2001/278668, filed Sep. 13, 2001, and 2001/376292, filed Dec. 10, 2001. The entire disclosure of each of those prior applications is incorporated herein by reference.

BACKGROUND OF THE INVENTION

1. Field of the Invention

The invention relates to an image reading apparatus, and particularly to an image reading apparatus adapted to read an image formed on a sheet while transporting the sheet.

2. Related Background Art

As an image reading apparatus for reading an image formed on a sheet, there is, for example, one of an original transporting type which is adapted to read an image formed on an original which is a sheet while transporting the original. As such image reading apparatuses of the original transporting type, there are known facsimile apparatuses, scanners, copying machines, etc.

Now, among these apparatuses, there is one of a type which reads the images of the front side and back side of an original at a time. FIG. 12 of the accompanying drawings shows an example of such an image reading apparatus according to the conventional art, and this image reading apparatus is provided with a transport path for U-turning an original P, i.e., a so-called U-turn path, in order to make the area occupied by the apparatus small.

When originals P are to be read, the originals P are first set with their front sides facing upwardly on an original feed tray 401 on the front face (the right side as viewed in FIG. 12) of the apparatus, and the uppermost one of the thus set originals P is separated by a separation portion 402, and is fed into image reading portions 404 and 405 by a pair of transport rollers 403.

Next, the images on the front side and back side of this original P are read by image sensors 404a and 405a, respectively, provided in the image reading portions 404 and 405. Platen rollers 404b and 405b are disposed in opposed relationship with these image sensors 404a and 405a, respectively, and the original P is brought into close contact with contact glass surfaces on the respective image sensors by these platen rollers 404b and 405b, whereby the reading of the images of the original can be done well.

The original P of which the images on the front side and back side have been read in the this manner is thereafter passed through a U-turn guide portion 407 by a pair of transport rollers 406, and is stacked with its front side facing downwardly on an original delivery tray 409 provided on the upper surface of the apparatus, by a pair of delivery rollers 408.

According to the image reading apparatus of such a construction, the area occupied by the apparatus becomes relatively small and moreover, the take-in and delivery of the original P are in the same direction and therefore, the setting and collection of the originals P can be effected easily.

On the other hand, FIG. 13 of the accompanying drawings shows another example of the image reading apparatus according to the conventional art, and this image reading apparatus is of a type in which originals P are set on the upper portion of the rear side (the right upper side as viewed in FIG. 13) of the apparatus with their front sides facing downward, and are transported substantially linearly.

When the originals P are to be read, the originals P are first set on an original feed tray 401 with their front sides facing downward, and the uppermost one of the thus set originals P is separated by a separation portion 402, and thereafter is fed into image reading portions 404 and 405 by a pair of transport rollers 403.

Next, the images on the front side and back side of this original P are read by image sensors 404a and 405a provided in the image reading portions 404 and 405, respectively. Thereafter, the original P of which the images on the front side and back side have been thus read is stacked on an original delivery tray 409 in the lower portion of the front side (the left lower side as viewed in FIG. 13) of the apparatus with its front side facing downward by a pair of delivery rollers 408.

According to the image reading apparatus of such a construction, the transport path of the original P is a so-called straight path approximate to a straight line and therefore, there is the advantage that relatively stable transport of the original P can be effected and moreover, the transport rollers and the transport guides can be made into a necessary minimum construction. Further, if the angle of the straight path is made great with respect to a horizontal plane and the angle of the original feed tray 401 is made upright and the original P is transported at an angle approximate to verticality, the area occupied (projected) by the entire apparatus can be made small.

However, in such an image reading apparatus according to the conventional art, for example, in the image reading apparatus as shown in FIG. 12, to make the entire apparatus compact, it is necessary to make the curvature of the U-turn guide portion small, but if the curvature is made small, not only it will become impossible to transport a thick original having stiffness, but also the accuracy of transport will be reduced and bad transport will become liable to occur.

That is, when an original is transported by the use of a U-turn-path small in curvature, the entire apparatus can be made compact, but there is the disadvantage that as compared with the straight path, the range of application to the thickness of the original becomes narrow. There is also the disadvantage that transport rollers and a transport guide become necessary in the U-turn portion and the construction becomes complicated.

On the other hand, in the image reading apparatus as shown in FIG. 13, if the angle of the straight path is made great with respect to the horizontal plane and the original is transported at an angle approximate to verticality, the area occupied (projected) by the apparatus can be made small, but in this case, it is necessary to dispose the original delivery tray 409 at an angle approximate to verticality.

However, if the original delivery tray 409 is disposed at an angle approximate to verticality as described above, there is the disadvantage that the position of the original delivery tray 409 becomes high relative to the installation surface and the height dimension of the apparatus becomes great and the operability of the apparatus becomes bad. Accordingly, it is more advantageous in the compactness and operability of the apparatus for the original delivery tray 409 to be disposed at an angle as approximate to horizontal as possible.

However, if the original delivery tray 409 is disposed at an angle approximate to horizontal as described above, the transport direction of the original P transported at an angle approximate to verticality will come to change greatly short of the original delivery tray 409. If the original delivery angle changes greatly like this, there has been the disadvantage that it becomes impossible to deliver a thick original having stiffness or the delivered original becomes bent or delivery jam becomes liable to occur.

Also, in recent years, an image forming apparatus such as an image reading apparatus, a printer, a copying machine or a facsimile apparatus is provided with a sheet feeding apparatus for separating sheets one by one and feeding them to an image reading portion or an image forming portion. As such a sheet feeding apparatus, use is widely made of one adopting a retard separation type capable of separating sheets with high reliability from a low speed to a high speed, as a mechanism for separating the sheets.

As shown, for example, in FIGS. 14A, 14B and 14C of the accompanying drawings, the retard separation type is adapted to separate and feed sheets S one by one by a feed roller 411 rotated in a sheet feeding direction (the direction indicated by the arrow A in FIG. 14A), and a separation roller 412 (retard roller) urged against the feed roller 411 with predetermined pressure and rotated in a direction opposite to the sheet feeding direction, in other words, a direction for returning the sheets S.

A torque limiter for generating slide at a prescribed or greater load is provided in the driving force transmitting path of the separation roller 412. This torque limiter is usually adapted to work by a load comprising the frictional force between the feed roller 411 and the sheet S. Thereby, the separation roller 412 is adapted to follow the rotation of (be rotated with) the sheet S, and transport a sheet.

On the other hand, when a plurality of sheets S overlapping one another come into the nip between the rollers, a sheet S which is brought into contact with the feed roller 411 by the slide among the sheets S is transported in the feeding direction. A sheet which is in contact with the separation roller 412 side is adapted to be returned by the separation roller 412 being reversely rotated.

Further, when multiple sheets S superposed one upon another are set, the stack of the sheets dashes into the nip between the rollers and the double feed of multiple sheets occurs. In order to prevent it, there is also known an apparatus in which as shown in FIG. 14B, an inclined surface portion is formed on this side of the separation roller 412 or as shown in FIG. 14C, a wall portion is formed to thereby provide such a guide portion 420 that a stack of a predetermined number of or more sheets does not dash into the nip.

However, in the above-described examples of the conventional art, particularly in the case of a longitudinal type sheet feeding mechanism, a stack of multiple sheets superposed one upon another is directly placed in the roller nip portion of the transport and separation device and therefore, the above-described operation of the separation roller 412 is blocked to thereby cause double feed and bad feed. Also, even if the guide portion 420 shown in FIG. 14B or 14C is provided, sheets having a high coefficient of friction come into between the guide portion 420 and a transport guide more than necessary, with the aid of gravity of the sheets S, to thereby cause the double feed of multiple sheets or the non-feed by sheet jam.

SUMMARY OF THE INVENTION

So, the present invention has been made of such circumstances and an object thereof is to provide an image reading apparatus which can be made small in the area occupied (projected) by the apparatus and can stably transport even a thick original (sheet) having stiffness.

Another object of the present invention is to provide a sheet transporting and separating apparatus which even if multiple sheets are set, can reliable separate them into a sheet and transport it, and eliminate the situation in which the treatment of the sheets has been stagnated by non-feed.

The present invention provides an image reading apparatus adapted to read an image on a sheet contained in an inclined sheet containing portion, and thereafter deliver the sheet, and provided with an image reading portion for reading the image on the sheet, a substantially horizontal delivery stacking portion for stacking the delivered sheet thereon, a vertically extending first sheet transporting path for transporting the sheet to the image reading portion, and a substantially horizontally extending second sheet transporting path for transporting the sheet on which the image has been read to the substantially horizontal delivery stacking portion, the image reading portion being provided between the vertically extending first sheet transporting path and the horizontally extending second sheet transporting path, and the transport direction of the sheet passed along the first sheet transporting path being changed to a direction toward the second sheet transporting path in the image reading portion.

Also, in the present invention, the image reading portion may be provided in a state horizontally inclined more by a predetermined amount than the angle of the first sheet transporting path, and the transport direction of the sheet may be changed on a surface containing the reading position of the image reading portion.

Also, in the present invention, the image reading portion may be provided with image reading means for reading the image on the sheet, and regulating means provided in opposed relationship with the image reading means for causing the sheet to pass while bringing the sheet into close contact with the image reading means.

Also in the present invention, the regulating means may preferably be a roller.

Also, in the present invention, the roller may be provided while being deviated by a predetermined distance toward the upstream side of the reading position of the image reading means in the transport direction of the sheet.

Also, in the present invention, the regulating means may be a plate-shaped member having a smooth surface, and the plate-shaped member may be provided at a predetermined position upstream of the reading position of the image reading means in the transport direction of the sheet and whereat the transport direction of the sheet can be changed.

Also, the present invention provides an image reading apparatus provided with original transporting means for transporting an original along a transporting path, image reading means for reading the image information of the original transported by the original transporting means at a predetermined reading position, and original delivering means for delivering the original read by the image reading means, wherein the transporting path is bent near the reading position of the image reading means.

Also, in the present invention, the transporting path may preferably be bent upstream of the image reading position of the image reading means.

Also, in the present invention, the image reading apparatus may be provided with regulating means provided in opposed relationship with the image reading means for causing the original to pass while bringing the original into close contact with the original reading surface of the image reading means, and the transporting path may preferably be bent along the regulating means.

Also, in the present invention, the regulating means may include a roller, and the transporting path may preferably be bent along the peripheral surface of the roller.

Also, in the present invention, the regulating means may preferably be provided with a predetermined amount of deviation toward the upstream side of the reading position of the image reading means in the transport direction of the original.

Also, in the present invention, the shaft center position of the roller may preferably be disposed with a predetermined amount of deviation toward the upstream side of the reading position of the original reading surface in the transport direction of the original.

Also, the sheet transporting and separating apparatus of the present invention is a sheet transporting and separating apparatus for separating a plurality of sheets into one sheet and transporting it by a pair of rollers comprising a feed roller and a separation roller disposed in opposed relationship with each other, the separation roller is comprised of an elastic member, and a transport regulating guide adapted to be relatively protruded by the deformation of the elastic member is provided near the separation roller.

Also, in the sheet transporting and separating apparatus of the present invention, the transporting regulating guide may preferably be formed so that as it becomes closer to the nip portion between the pair of rollers, the amount of deformation of the separation roller required to protrude may increase.

Also, in the sheet transporting and separating apparatus of the present invention, the transport regulating guide may preferably be formed into the shape of a staircase.

Also, in the sheet transporting and separating apparatus of the present invention, the transport regulating guide may preferably be formed of a flexible material, and may about against the vicinity of the nip portion between the pair of rollers on the feed roller.

Also, in the sheet transporting and separating apparatus of the present invention, the transport regulating guide may preferably be formed of an elastically deformable flexible material, and may be designed to come into the feed roller side in non-contact therewith so as to interrupt the transport of the sheet near the nip portion between the pair of rollers on the feed roller.

Also, in the sheet transporting and separating apparatus of the present invention, an uneven shape may preferably be formed on that side of the transport regulating guide which is adjacent to the feed roller.

According to the present invention, by the above-described construction, even if a sheet stack comprising multiple sheets superposed one upon another dashes in, it becomes possible to receive the sheet stack by the transport regulating guide having the sheet receiving function without hindering the operation of the separation roller, and suppress the entry of the sheets to the entry of a proper small number of sheets into the nip between the pair of rollers. Also, even if a sheet is caught by the transport regulating guide, the separation roller comprising an elastic member pushes out the sheet and therefore, the non-feed of the sheet can be avoided.

Also, even with the transport regulating guide made to abut against the feed roller or enter in the non-contact therewith it becomes possible to suppress the entry of a stack of multiple sheets superposed one upon another to the entry of a proper small number of sheets, and handle the leading edge portion of the sheets by the uneven shape thereof and reliably separate them into one sheet.

DESCRIPTION OF THE PREFERRED EMBODIMENTS

Some embodiments of the present invention will hereinafter be described in detail with reference to the drawings.

Figure 1:
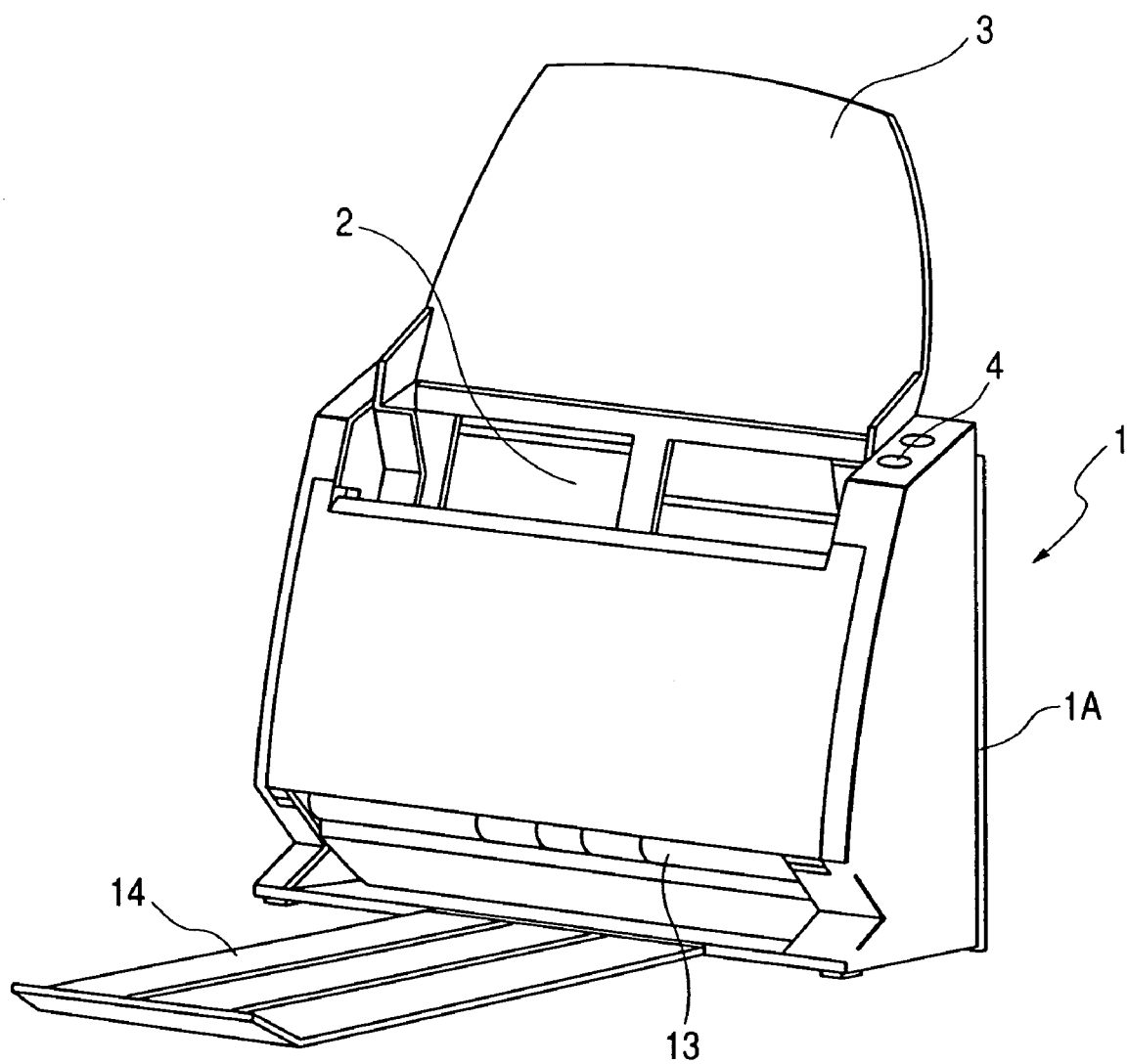
FIG. 1 is a pictorial perspective view of an image reading apparatus according to a first embodiment of the present invention.
Figure 2:
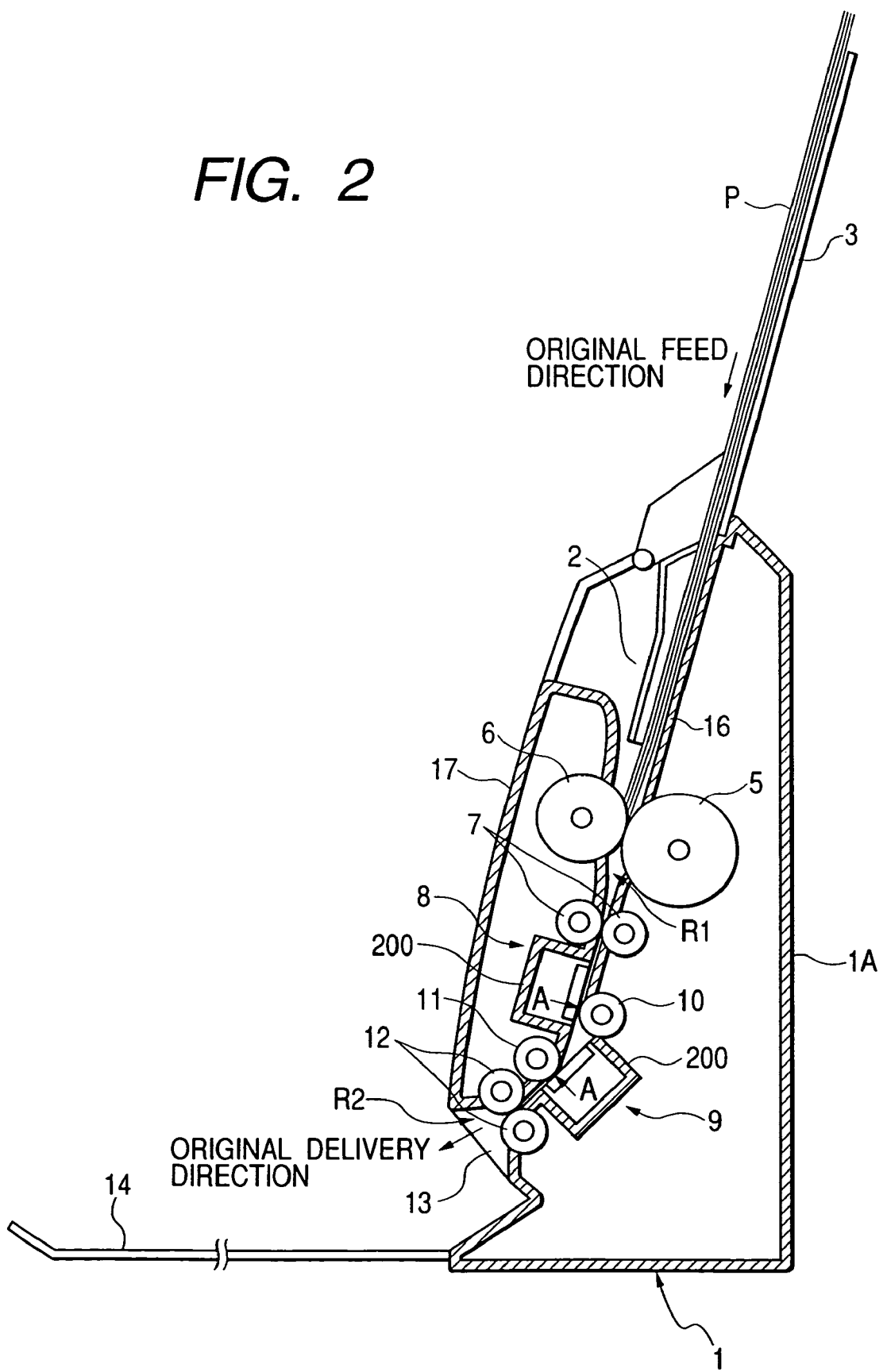
FIG. 2 is a cross-sectional view schematically showing the construction of the image reading apparatus of FIG. 1.

FIG. 1 is a pictorial perspective view of an image reading apparatus according to a first embodiment of the present invention, and FIG. 2 is a cross-sectional view schematically showing the construction thereof.

In FIGS. 1 and 2, the reference numeral 1 designates the image reading apparatus, the reference character 1A denotes the main body of the image reading apparatus (hereinafter referred to as the main body of the apparatus), the reference numeral 2 designates a feed port provided in the upper portion of the main body 1A of the apparatus, and the reference numeral 3 denotes an original feed tray which is an inclined sheet containing portion disposed above the feed port 2 at an angle approximate to vertically, and an original P which is a sheet is set on the original feed tray 3 with its lower end portion inserted in the feed port 2 and with its front side facing downward.

Also, the reference numeral 5 designates a feed roller given a driving force in a direction for pulling the original P into the main body 1A of the apparatus, and the reference numeral 6 denotes a retard roller which is adapted to be given a driving force in a direction for pushing back the original P with predetermined torque by a torque limiter 30 shown in FIG. 5 to be described later which is connected to the retard roller 6.

Also, the reference numerals 8 and 9 designate upper and lower image reading portions for reading the images of the original P, and these upper and lower image reading portions 8 and 9 are disposed with a first transporting path R1 which will be described later interposed therebetween, and design is made such that the image on the back side of the original P is read by the upper image reading portion 8 and the image on the front side of the original P is read by the lower image reading portion 9.

Description will now be made of the image reading operation of the thus constructed image reading apparatus 1.

When the start button 4 of an operating portion shown in FIG. 1 is first depressed and a reading start command is outputted, the feed roller 5 and the retard roller 6 start to be rotated. When only an original P has entered the nip portion between the feed roller 5 and the retard roller 6, the retard roller 6 is rotated with the original P by the torque limiter, whereby the original P is fed to transport rollers 7 by the transporting force of the feed roller 5.

Also, when a plurality of originals P have entered the nip portion at a time, the retard roller 6 is rotated in a direction opposite to the transport direction of the originals P by the torque limiter to thereby push back the second and subsequent originals P which are out of contact with the feed roller 5, and when the first original P alone remains, the retard roller 6 starts to be rotated with that original P in accordance with the transport thereof. By such retard separation by the retard roller 6, the originals P are separated one by one and fed to the transport rollers 7.

Next, the original P is transported to the upper and lower image reading portions 8 and 9 at a predetermined speed by the transport rollers 7. Now, in the present embodiment, these upper and lower image reading portions 8 and 9 are adapted to read the images formed on the front side and back side of the originals P by contact image sensors 200 which are image reading means.

Figure 3:
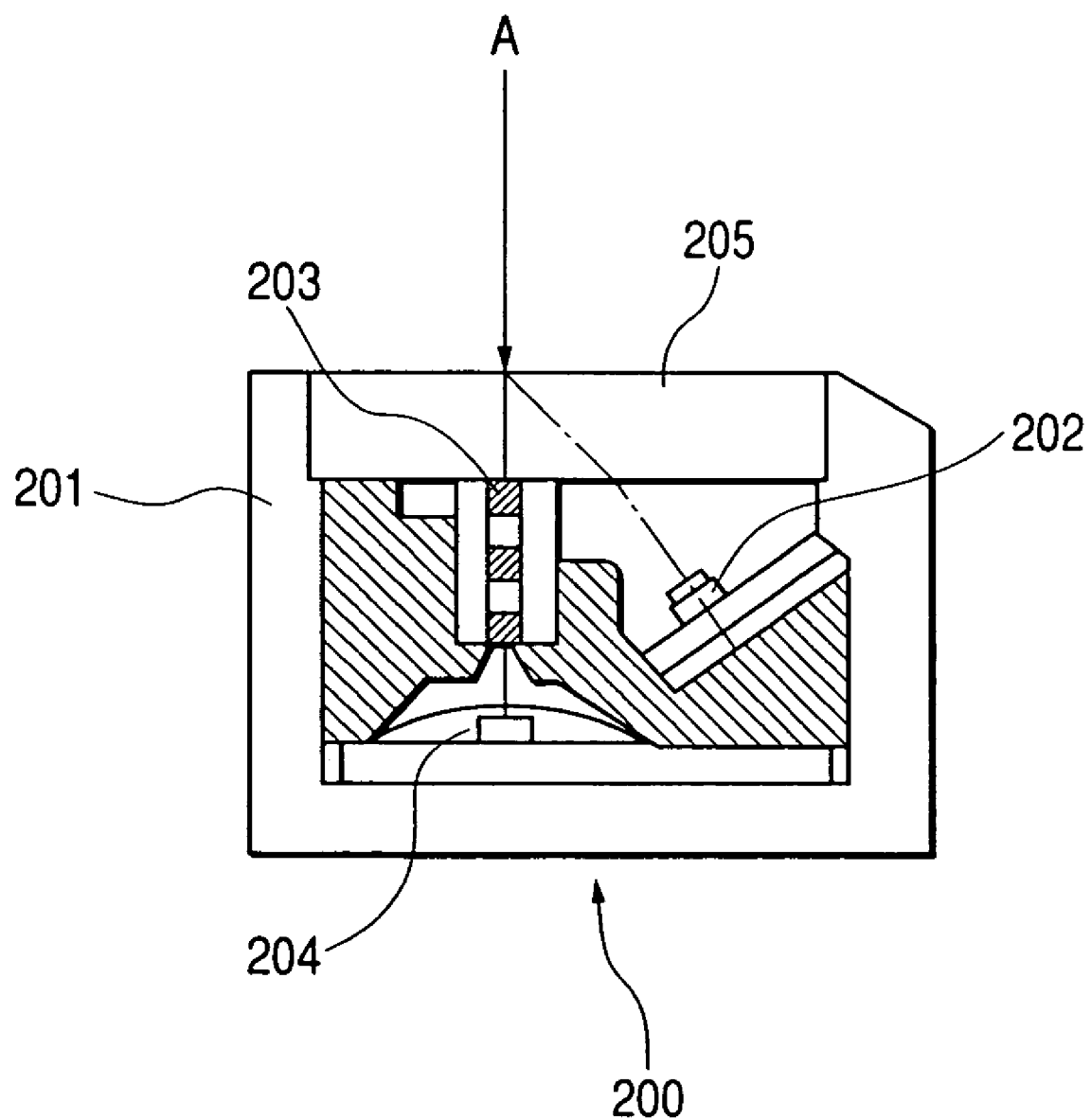
FIG. 3 is a cross-sectional view showing the construction of the contact image sensor of an image reading portion provided in the image reading apparatus of FIG. 1.

FIG. 3 shows the construction of such a contact image sensor 200, and as shown in FIG. 3, the contact image sensor 200 has an LED 202 which is a light source, a lens array 203 and an image sensor (light receiving element) 204 disposed in a frame 201, and contact glass 205 is installed on the upper surface of the frame 201 including the reading position A of the contact image sensor 200.

The contact image sensor 200 is designed such that when the original P passes the upper portion of the contact glass 205, light is projected thereto by the LED 202. The thus projected light is reflected by the original reading surface of the reading position A, and is imaged on the image sensor (light receiving element) 204 by the lens array 203. The thus imaged image is converted into an electrical signal by the image sensor (light receiving element) 204, whereafter various kinds of image processing are effected, whereby the images of the original are read.

This contact image sensor 200 is shallow in depth of focus and therefore, in the upper and lower image reading portions 8 and 9 provided with such contact image sensors 200, to read the image information of the original P well, it is necessary to bring the original P into close contact with the surface of the contact glass installed on the contact image sensors.

Therefore, as shown in FIG. 2, in opposed relationship with the reading positions A of the upper and lower image reading portions 8 and 9, there are installed platen rollers 10 and 11 which are regulating means for pressing the original P into close contact with the original reading surfaces of the image reading portions 8 and 9 (the surfaces of the contact glass shown in FIG. 3) and also transporting the original P at a predetermined speed.

In the present invention, the surfaces of these platen rollers 10 and 11 are white so as to be capable of effecting the detection of a shading signal. The detection of the shading signal is effected by reading the white reference level of the white surfaces of the platen rollers 10 and 11 by the contact image sensors 200 before the original P is transported to the image reading portions 8 and 9.

Further, in the present embodiment, the platen rollers 10 and 11 are held so that the outer peripheral surfaces thereof may not directly contact with but keep a predetermined interval (of the order of 0.5 mm) relative to the original reading surfaces of the upper and lower image reading portions 8 and 9 (the surfaces of the contact glass).

This is for preventing the occurrence of the stains and scars of the white surfaces of the platen rollers 10 and 11, and preventing the bad detection of the shading signal and at the same time, suppressing the load of a mechanical system from being increased by the contact friction between the platen rollers 10, 11 and the contact glass when the original P is absent.

On the other hand, as already described, the original P which has passed the transport rollers 7 has the image on its back side read in the upper image reading portion 8 having its reading surface disposed in parallelism to the transport direction of the original, whereafter it has the image on its front side read in the lower image reading portion 9.

Next, the original P which has passed the reading position A of this lower image reading portion 9 is transported to delivery rollers 12 which are original delivering means and is delivered from a delivery port 13 onto an original delivery tray 14 which is a substantially horizontal delivery stacking portion with its front side facing downward by the delivery rollers 12. The second and subsequent originals P are also subjected to a similar operation, and the originals P are stacked on the original delivery tray 14 in the same order as when they were set on the original feed tray 3.

Now, the original P is transported at a constant speed by the transport rollers 7, the platen rollers 10, 11 and the delivery rollers 12 until the trailing edge of the original P completely passes between the delivery rollers 12. The original feeding speed of the feed roller 5 is set to a speed lower than that of the rollers 7, 10, 11 and 12 so that the reading of the images of the original may be effected appropriately.

Even when as described above, the original feeding speed of the feed roller 5 is set to a speed lower than the original transporting speed of the rollers 7, 10, 11 and 12, the feed roller 5 is adapted to be rotated with the original P from after the leading edge portion of the original P has arrived at the transport rollers 7 until the trailing edge portion of the original P passes the feed roller 5, because a one-way clutch (not shown) is connected to the roller driving shaft of the feed roller 5.

On the other hand, in FIG. 2, the reference numeral 16 designates a lower frame provided with the feed roller 5, the transport (drive) rollers 7, the platen roller 10, the lower image reading portion 9 and the delivery (drive) roller 12 and forming a lower transport guide, and the reference numeral 17 denotes an upper frame provided with the retard roller 6, the transport (driven) roller 7, the upper image reading portion 8, the platen roller 12 and the delivery (driven) roller 12 and forming an upper transport guide.

A first transporting path R1 which is a vertically extending first sheet transporting path for transporting the original P to the image reading portions 8 and 9, and a second transporting path R2 which is a second sheet transporting path for transporting the original P of which the images have been read to a substantially horizontal original delivery tray 14 are formed by the lower frame 16 and the upper frame 17.

Figure 4:
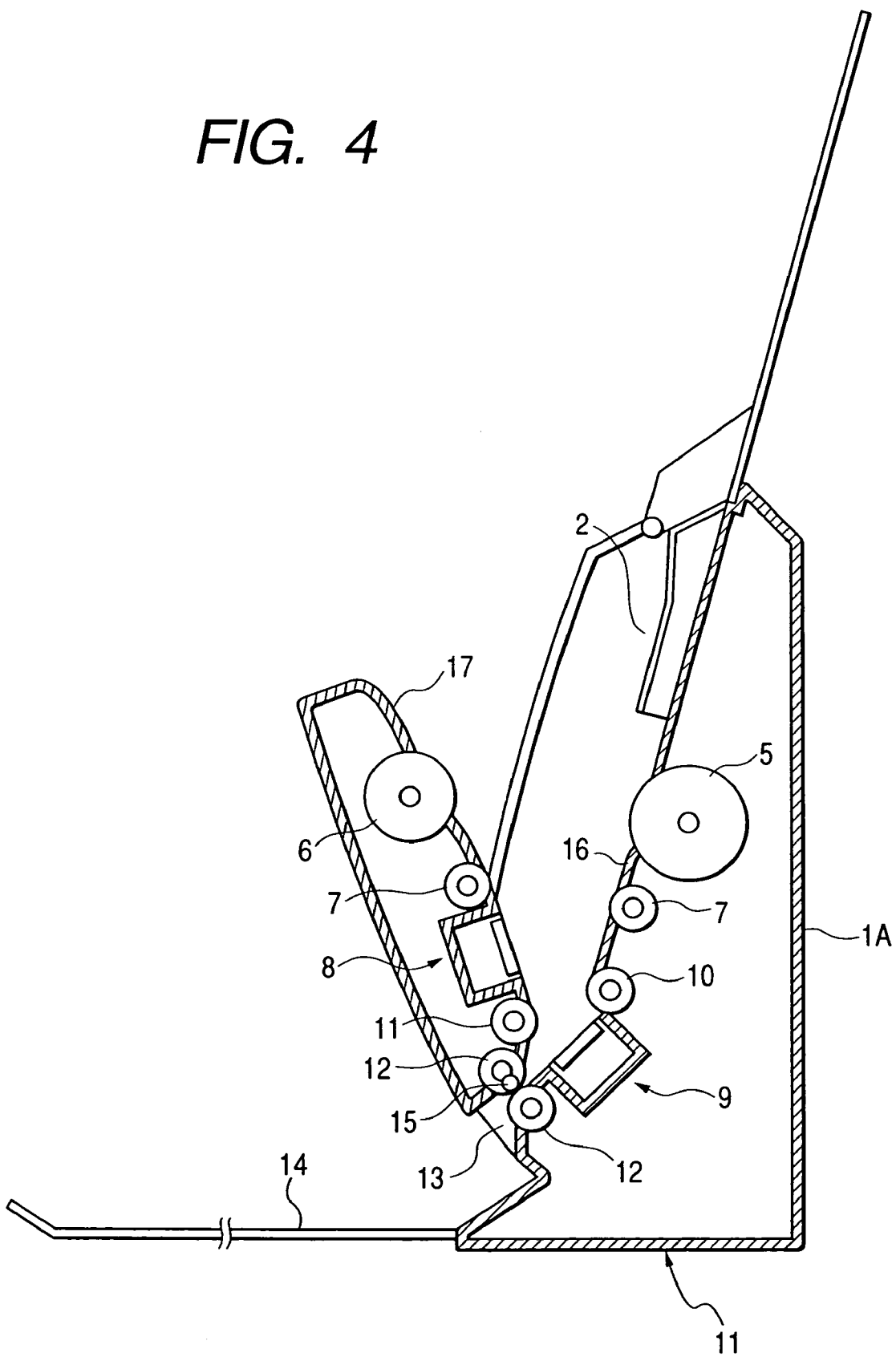
FIG. 4 is a cross-sectional view showing a state in which first and second transporting paths of the image reading apparatus of FIG. 1 are opened.

The upper frame 17, as shown in FIG. 4, is supported on the main body 1A of the apparatus for pivotal movement with an opening and closing hinge 15 provided near the delivery roller 12 as a fulcrum. When the original P is jammed on the transporting path or when the contact glass and the platen rollers 10 and 11 of the image reading portions 8 and 9 are stained, the upper frame 17 is pivotally moved with the opening and closing hinge 15 as the fulcrum as shown in FIG. 4 to thereby open the first and second transporting paths R1 and R2, whereby the treatment of the jam of the original or the cleaning of the contact glass 205 and the platen rollers 10 and 11 can be done easily.

Figure 5:
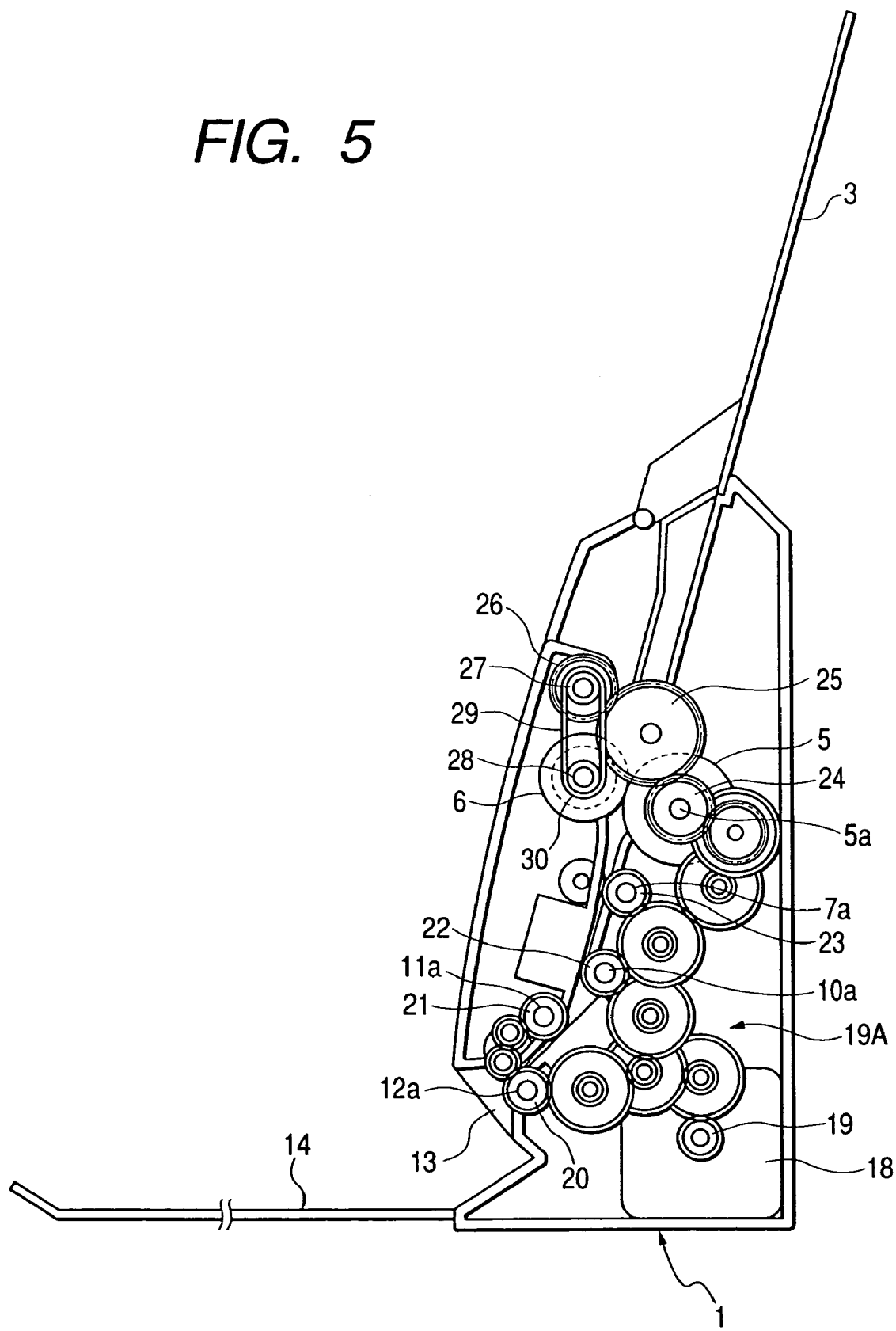
FIG. 5 shows the original transport driving system of the image reading apparatus of FIG. 1.

On the other hand, FIG. 5 shows the original transport driving system of the image reading apparatus 1 according to the present embodiment. In FIG. 5, the reference numeral 18 denotes an original transporting motor, and the motor gear 19 of this original transporting motor 18 is connected to a gear 20 fixed to the shaft 12a of the delivery (drive) roller 12, gears 22 and 21 fixed to the shafts 10a and 11a, respectively, of the platen rollers 10 and 11, a gear 23 fixed to the shaft 7a of the transport (drive) roller 7, and a gear 24 fixed to the shaft 5a of the feed roller 5, by a gear train 19A, so as to transmit the drive of the motor to the rollers 7, 10, 11 and 12.

The drive of the gear 24 fixed to the shaft 5a of the feed roller 5 is adapted to be further transmitted by gears 25, 26, pulleys 27, 28 and a belt 29 so as to drive the retard roller 6 through a torque limiter 30 mounted in the retard roller 6.

Now, in the present embodiment, the lower image reading portion 9, as shown in FIG. 2, is provided in a state in which the reading surface thereof is inclined in a horizontal direction by a predetermined angle with respect to the original transport direction up to the upper image reading portion 8 provided upstream, in other words, with respect to the sheet transport direction (angle) in the first transporting path R1.

By the lower image reading portion 9 being thus provided in a state in which it is inclined by the predetermined angle, the original P which has passed the reading position A in the lower image reading portion 9 is adapted to be transported to the second transporting path R2 while changing its transport direction along the surface of the contact glass 205 including the reading position A by the platen roller 11.

By the original P being thus transported while changing its transport direction by the platen roller 11, even when the angle formed by the first transporting path R1 with the second transporting path R2 is great, the transport direction of the original P can be changed within a short transport distance range and without the use of any discrete roller or the like.

As a result, the delivery of the original to the original delivery tray 14 can be effected smoothly even when the original feed tray 3 is provided at an angle approximate to verticality and the original delivery tray 14 is disposed at an angle approximate to horizontal. Also, the entire original transporting path can be made compact, whereby the main body 1A of the apparatus can be downsized and the area occupied (projected) by the apparatus can be made small. Further, even a thick original P having stiffness can be stably transported.

Now, when the leading edge portion of the original P passes the reading positions A of the image reading portions 8 and 9, if the shaft center positions of the platen rollers 10 and 11 coincide with the reading positions A of the contact image sensors 200 of the image reading portions 8 and 9 on the surface opposed to the platen rollers 10 and 11, the original P may be fluttered between the contact image sensors 200 and the platen rollers 10, 11 by the shock when the leading edge portion of the original P being transported comes into contact with the platen rollers 10, 11 or the surfaces of the contact glass of the contact image sensors 200 and therefore, it is preferable in effecting appropriate image reading to suppress such fluttering of the original P.

Description will now be made of a second embodiment of the present invention in which such fluttering of the original P is suppressed.

Figure 6:
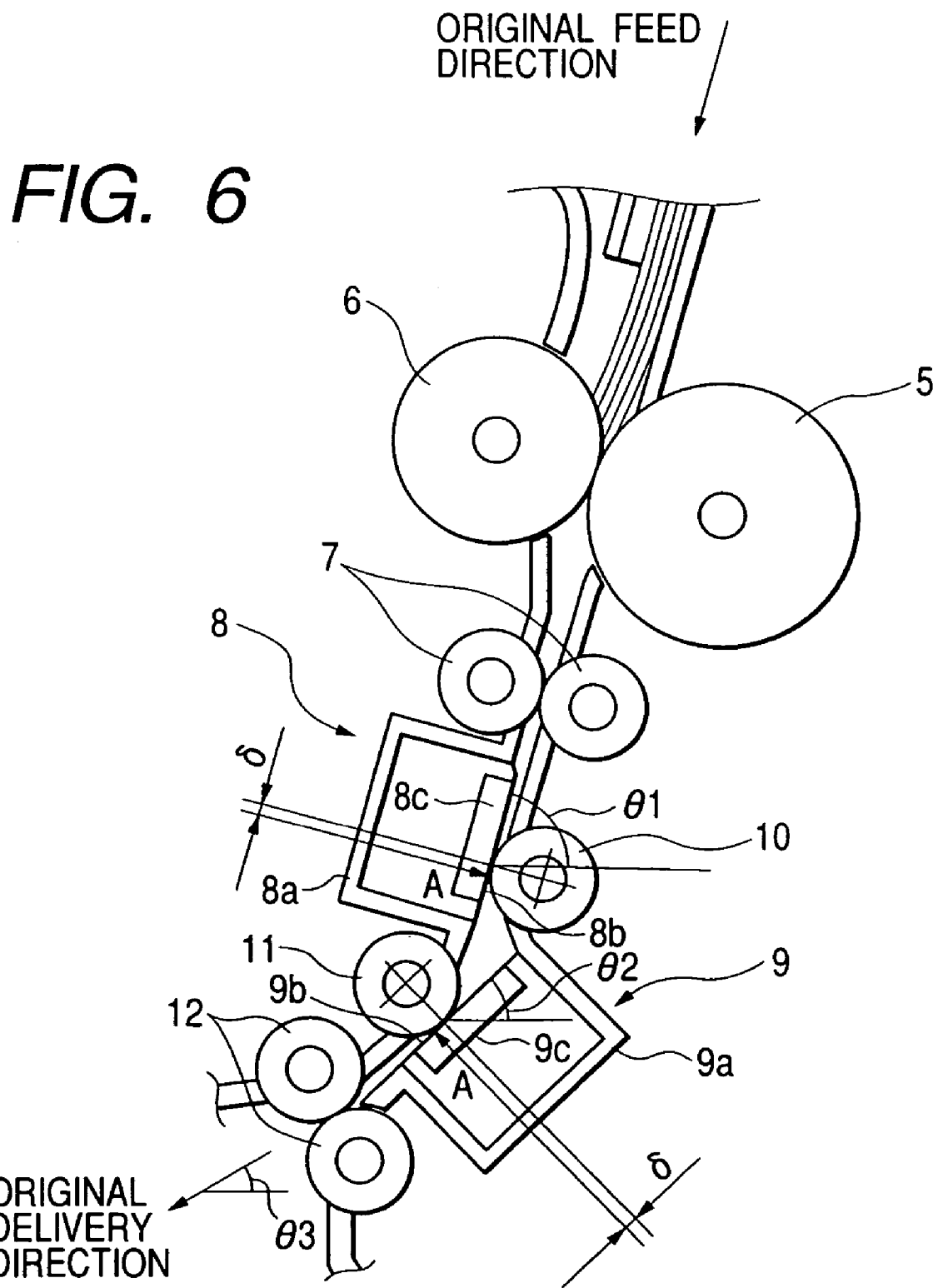
FIG. 6 is an enlarged view of the essential portions of an image reading apparatus according to a second embodiment of the present invention.

FIG. 6 is an enlarged view of the essential portions of an image reading apparatus according to the present embodiment. In FIG. 6, the same reference characters as those in FIG. 2 designate the same or corresponding portions.

In the present embodiment, as shown in FIG. 6, the shaft center positions of the platen rollers 10 and 11 are disposed at locations deviated by a predetermined amount δ from the reading positions A of the contact image sensors 200 of the image reading portions 8 and 9 toward the upstream side in the original transport direction.

By the shaft center positions of the platen rollers 10 and 11 being thus disposed on the upstream side (this side) of the reading positions A of the contact image sensors 200, when the original P contacts with the platen rollers 10 and 11 or the surfaces of the contact glass of the contact image sensors 200, the then shock can be prevented from affecting the read image and also, the behavior of the leading edge portion of the original at the reading positions A can be stabilized.

In the present embodiment, the value of this amount of deviation δ is of the order of 0.5 to 1.5 mm relative to the diameter 12 mm of the platen rollers. However, even such a slight amount of deviation δ can achieve a sufficient effect because the image reading line width of the contact image sensors 200 is very minute.

By the shaft center positions of the platen rollers 10 and 11 being thus deviated by the predetermined amount δ from the reading positions of the contact image sensors 200 toward the upstream side in the original transport direction, the fluttering of the original P when the leading edge portion thereof passes the reading positions A can be suppressed to thereby prevent the inconveniences of an image such as the blur and density unevenness of the read image.

Now, while in the description hitherto made, there has been described a case where in order to bring the original P into close contact with the original reading surface, the platen rollers 10 and 11 are disposed in opposed relationship with the reading positions A of the contact image sensors 200, the present invention is not restricted thereto, but design may also be made such that the original P is brought into close contact with the contact image sensors 200 by other member.

Description will now be made of a third embodiment of the present invention in which as described above, the original P is brought into close contact with the contact image sensors 200 by the use of other member.

Figure 7:
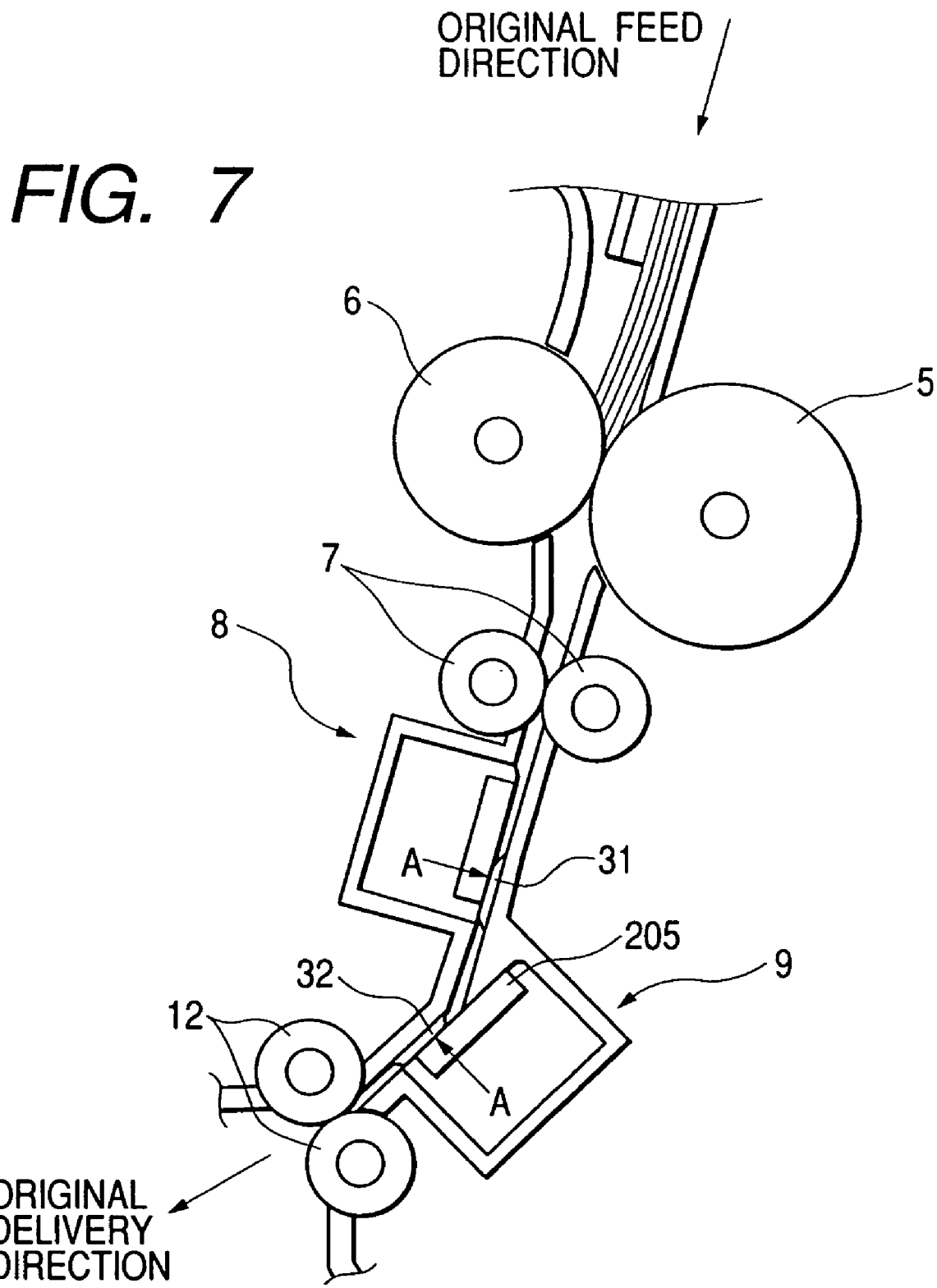
FIG. 7 is an enlarged view of the essential portions of an image reading apparatus according to a third embodiment of the present invention.

FIG. 7 is an enlarged view of the essential portions of an image reading apparatus according to the present embodiment. In FIG. 7, the same reference characters as those in FIG. 2 designate the same or corresponding portions.

In FIG. 7, the reference numerals 31 and 32 denote sheet members which are plate-shaped members provided, instead of the platen rollers, in opposed relationship with the contact image sensors 200 of the upper and lower image reading portions 8 and 9. These sheet members 31 and 32 are fixed with a predetermined interval kept with respect to the surfaces of the contact glass of the contact image sensors 200 so that the sheet members 31 and 32 as regulating means can bring the original P into close contact with the contact image sensors 200.

Again in the present embodiment, as in the aforedescribed first and second embodiments, the lower image reading portion 9 is provided at such a position that the transport angle of the original P is changed by the lower image reading portion 9, and the sheet members 31 and 32 are provided at such positions that the transport angle of the original P is changed on a surface containing the reading position of the lower image reading portion 9.

Further, the surfaces of the sheet members 31 and 32 are smoothly formed, and by the surfaces being thus made smooth, the transport resistance of the original P can be minimized and the transport jam thereof can be prevented. Further, by the color of the sheet members 31 and 32 being made white, they can be endowed with the function as white reference plates and can effect the detection of a shading signal.

As described above, design is made such that the original P is brought into close contact with the original reading surfaces of the image reading portions 8 and 9 by the sheet members 31 and 32, whereby a driving mechanism for driving the rollers as in the case where the platen rollers are used becomes unnecessary. Thereby, the structure of the apparatus becomes simple and the cost thereof can be reduced.

While in the present embodiment, the sheet members 31 and 32 are fixed with a predetermined interval kept with respect to the surfaces of the contact glass of the contact image sensors 200, the sheet members may be brought into contact with the surfaces of the contact glass with a minute pressure force by pressing means such as pressing springs.

Also, the points at which the transport direction of the original P is changed in the lower image reading portion 9 need not strictly be the reading positions A, but may be any positions on the surfaces of the contact glass 205 which are upstream of the reading positions A in the transport direction.

Next, for further detailed description, in each of the above-described embodiments, the contact image sensor 200 of the upper image reading portion 8 will be referred to as the first image sensor 8a, and the contact image sensor 200 of the lower image reading portion 9 will be referred to as the second image sensor 9b (typically see FIG. 6).

In the upper image reading portion 8, a first reading and transporting path for guiding the sheet is formed by the first contact glass 8c of the first image sensor 8a In the lower image reading portion 9, a second reading and transporting path for guiding the sheet is formed by the second contact glass 9c of the second image sensor 9a.

The angle of inclination $\theta 1$ of the guide surface 8b of the first contact glass 8c with respect to the horizontal plane is greater than the angle of inclination $\theta 2$ of the guide surface 9b of the second contact glass 9c with respect to the horizontal plane.

The angle of inclination $\theta 3$ of the common tangent (sheet delivery direction) of the pair of delivery rollers 12 with respect to the horizontal plane is smaller than the angle of inclination $\theta 2$ of the guide surface 9b of the second contact glass 9c with respect to the horizontal plane.

That is, the relation that $$\theta 1 > \theta 2 > \theta 3$$

is satisfied.

Figure 9A:
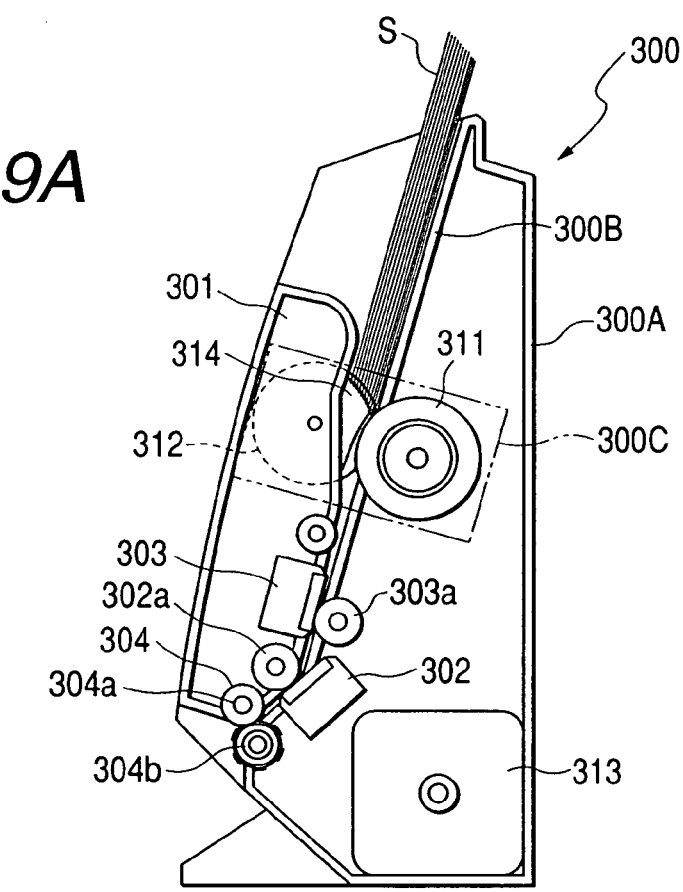
FIGS. 9A and 9B show an image reading apparatus according to an embodiment of the present invention.
Figure 9B:
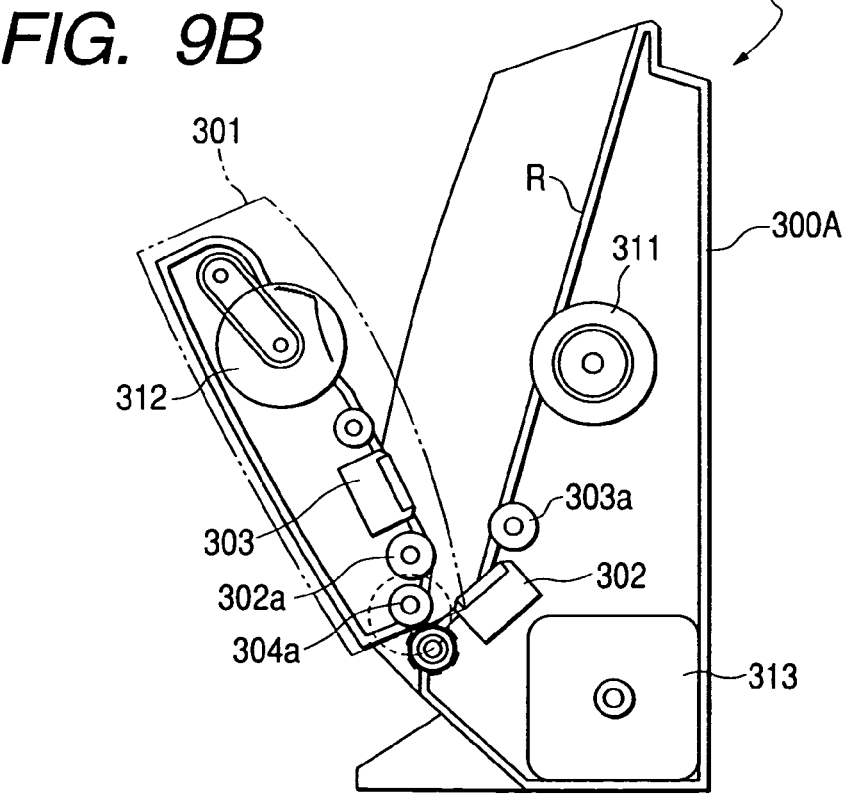

A fourth embodiment of the present invention will hereinafter be described with reference to the drawings. FIGS. 9A and 9B show the construction of an image reading apparatus which is an example of the application of the present invention. The epitome of this image reading apparatus will hereinafter be described. The reference numeral 300 designates the image reading apparatus, the reference character 300A denotes the main body of the image reading apparatus, the reference character 300B designates a sheet stacking portion which is a sheet containing portion in which sheets S are stacked and contained, the reference numerals 302 and 303 denote front side and back side image reading portions for reading the images on the sheets S, and the reference character 300C designates a sheet feeding apparatus for feeding the sheets S contained in the sheet stacking portion 300B to the front side and back side image reading portions 302 and 303.

The sheet feeding apparatus 300C is provided with separating and feeding means comprised of a feed roller 311 which is a feed rotary member and a separation roller 312 which is a separation rotary member urged against the feed roller 311, and for separating the sheets S stacked on the sheet stacking portion 300B one by one. The reference numeral 313 denotes a main motor for driving the feed roller 311 and the separation roller 312.

Description will now be made of the image reading operation of the thus constructed image reading apparatus 300. When the image reading operation is started, the plurality of sheets S placed on the sheet stacking portion 300B are separated one by one by the feed roller 311 and the separation roller 312 which are in pressure contact with each other. Thereafter, the sheet is passed while being into close contact with the front side and back side image reading portions 302 and 303 by platen rollers 302a and 303a.

During this passage, the image formed on the front side or the back side of the sheet S is line-scanned by passing while facing the front side and back side image reading portions 302 and 303, and is outputted as an electrical signal to the outside. Also, after the reading of the image has been thus effected, the sheet S is delivered to the outside by delivery rollers 304 (a pair of delivery rollers 304a and 304b).

In FIGS. 9A and 9B, the reference numeral 301 designates an upper unit constituting the main body of the sheet feeding apparatus provided with the separation roller 312, the back side image reading portion 303, the upper delivery roller 304a, etc. This upper unit 301 is usually closed as shown in FIG. 9A, but for example, in case of jam treatment, the cleaning of the rollers, etc. and maintenance, it is adapted to be upwardly opened as shown in FIG. 9B with a sheet transporting path R as the boundary. By being thus opened, it is designed to be capable of spacing the separation roller 312 apart from the feed roller 311.

Figure 8A:
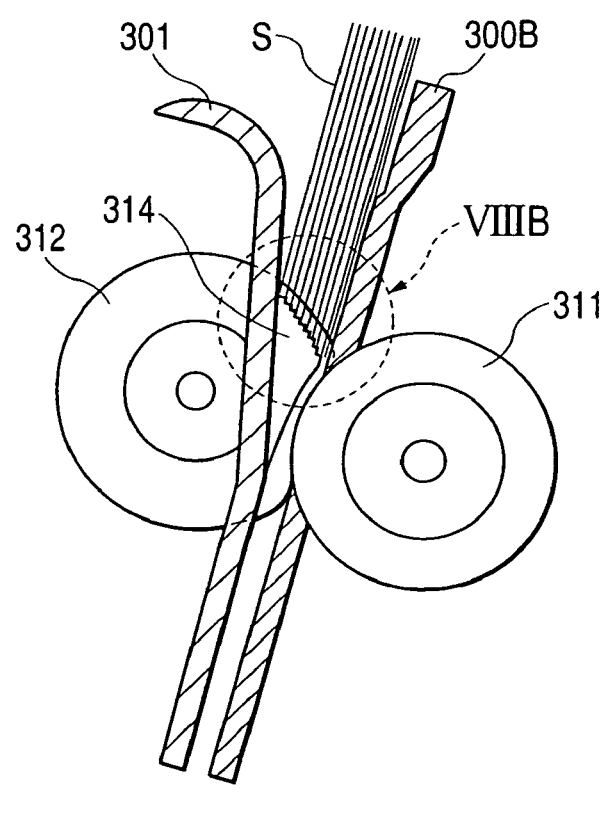
FIGS. 8A shows the construction of the essential portions of a sheet transporting and separating apparatus in a fourth embodiment of the present invention.
Figure 8B:
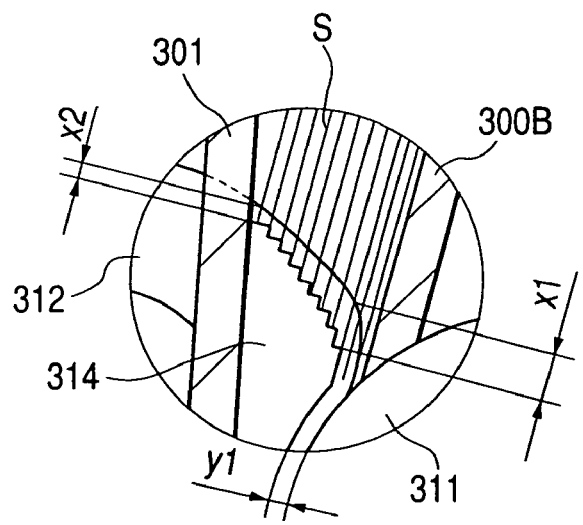
FIG. 8B is an enlarged view of the encircled portion indicated by the circle of VIII B in FIG. 8A.

Referring now to FIGS. 8A and 8B which best represent the sheet transporting and separating apparatus of the present invention, the construction of the present invention will be described. The sheet transporting and separating apparatus of the present invention includes a feed roller 311 and a separation roller 312 opposed to and being in pressure contact with each other, and the feed roller 311 is rotated in the sheet transport direction, and the separation roller 312 is comprised of an elastic member and has motive power transmitted thereto so as to be rotated in the opposite direction.

Also, there is provided a torque limiter in the drive transmitting path of the separation roller 312, and the separation roller is driven to rotate (is rotated with the sheet) in the sheet transporting direction in a state in which there is sheet S or a state in which a sheet is being transported between the feed roller 311 and the separation roller 312. In a state in which a plurality of sheets superposed one upon another have dashed into between these rollers, the separation roller 312 is designed to be rotated in the opposite direction. Also, in the present construction, transport regulating guides 314 are formed on the opposite sides of the separation roller 312 so that sheets superposed one upon another beyond a prescribed number of sheets may not dash into between the rollers.

These transport regulating guides 314, as shown in FIG. 8A, are formed inside the outer periphery of the separation roller 312, and the surfaces thereof against which the sheets dash are formed in the shape of a staircase so that the distance thereof from the outer periphery may increase, that is, may be x1>x2 as shown in FIG. 8B, as it approaches the nip. Also, the surface opposed to the feed roller 311 is formed so as to have a gap y1 calculated from the number of separable sheets S.

By the present construction, the transport regulating guide 314 is formed so as to protrude relative to the separation roller 312 so as to be exposed from the separation roller 312 when multiple sheets S high in coefficient of friction and liable to enter together have deformed the separation roller 312 and have dashed in. Thereby, even if the multiple sheets S have dashed in, they are received by the staircase shape of the transport regulating guide 314 and only separable sheets corresponding to the gap y1 enter while overlapping one another, and can be reliably separated to one sheet by the retard roller portion and be transported to an image processing portion.

Even when the sheet S is caught by the staircase-shaped portion of the transport regulating guide 314, the sheet S is kicked out by the separation roller 312 comprised of an elastic member starting to be rotated in the opposite direction and is fed into the nip between the rollers, and can go out of a non-fed state. Thereby, even if multiple sheets S are set, they can be reliably separated into one sheet and transported to thereby eliminate a situation in which the treatment of the sheets has been stagnated by non-feed.

Figure 10A:
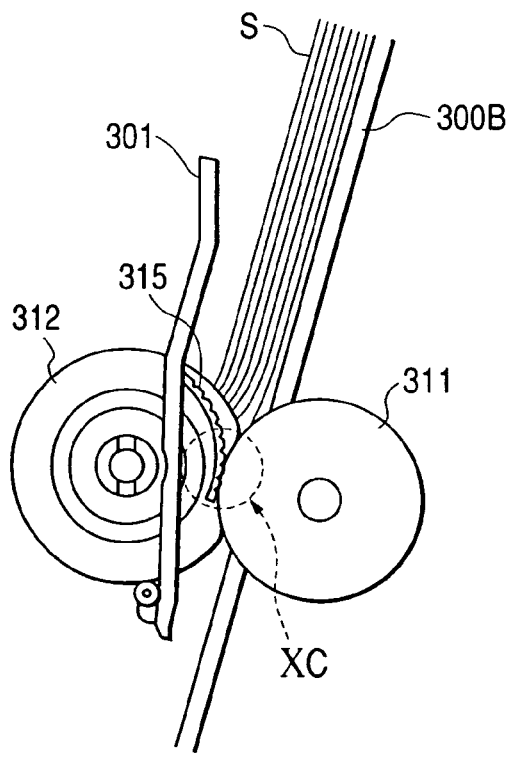
FIGS. 10A and 10B show a sheet transporting and separating apparatus in another embodiment of the present invention.
Figure 10B:
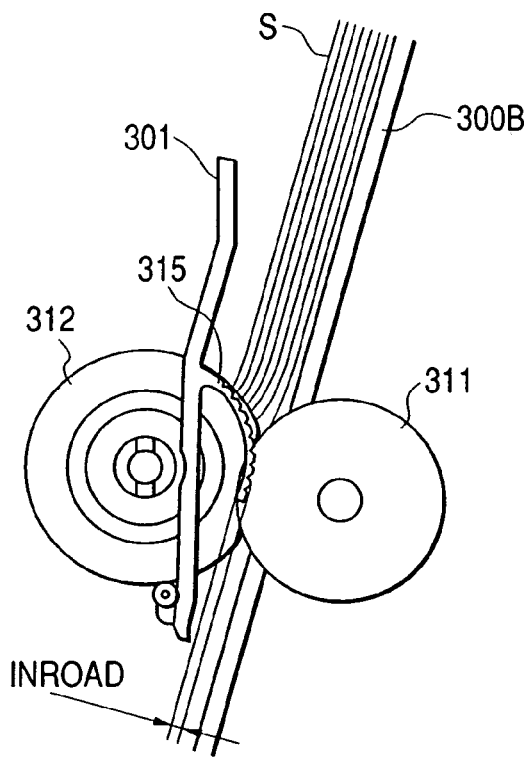
Figure 10C:
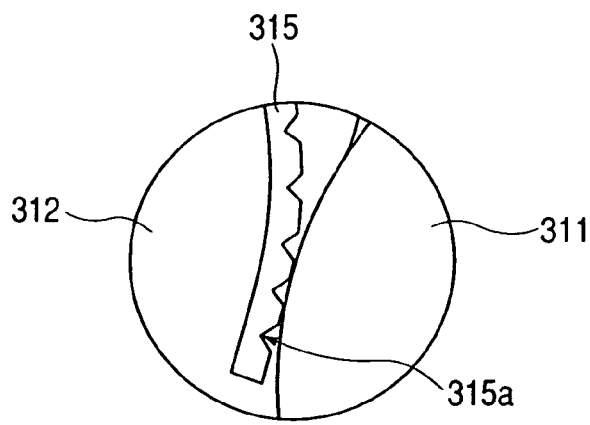
FIG. 10C is an enlarged view of the encircled portion indicated by the circle of XC in FIG. 10A.
Figure 11:
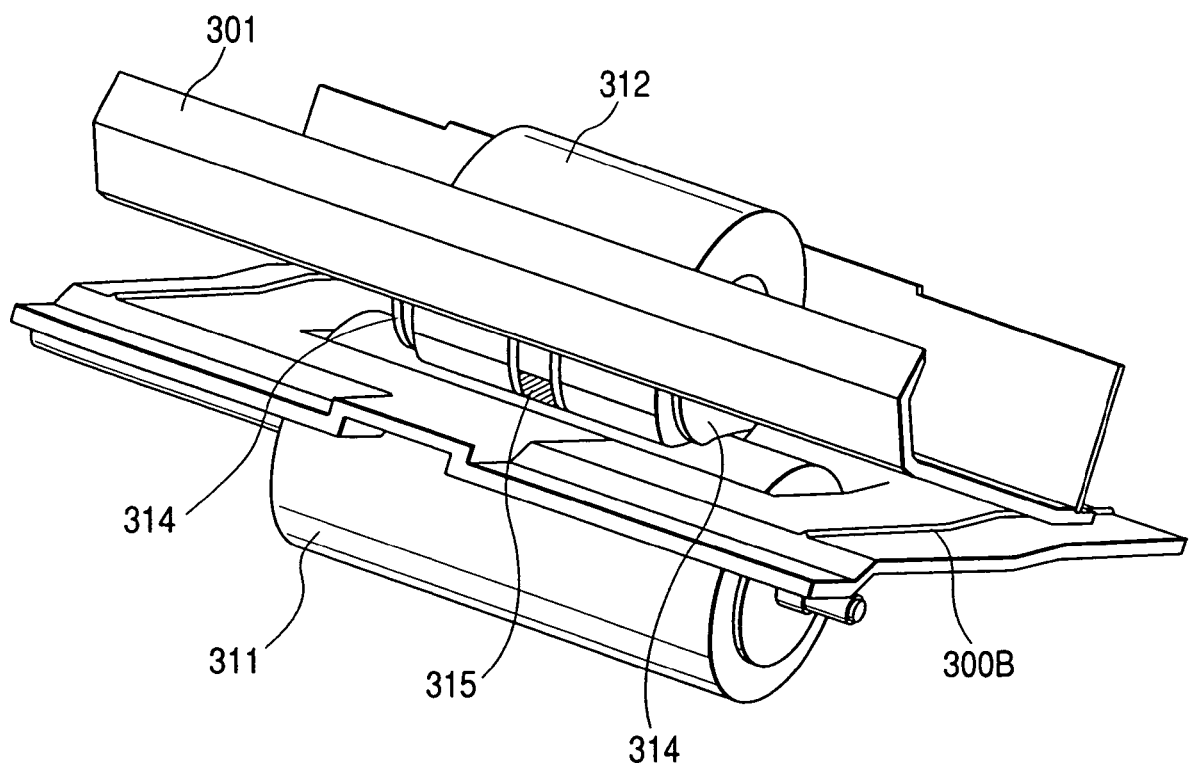
FIG. 11 is a perspective view showing a sheet transporting and separating apparatus in still another embodiment of the present invention.
Figure 12:
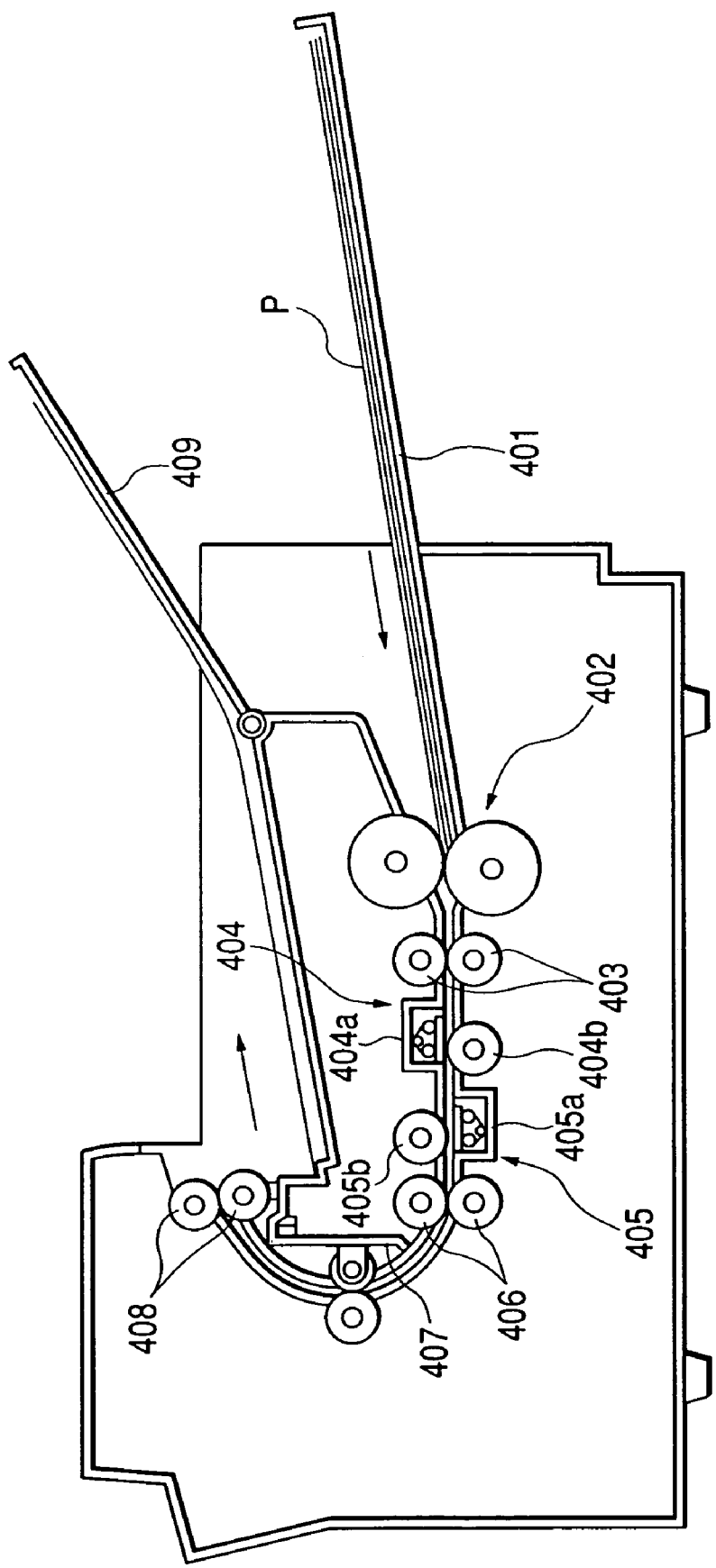
FIG. 12 schematically shows the construction of an example of an image reading apparatus according to the conventional art FIG. 13 schematically shows the construction of another example of the image reading apparatus according to the conventional art.
Figure 13:
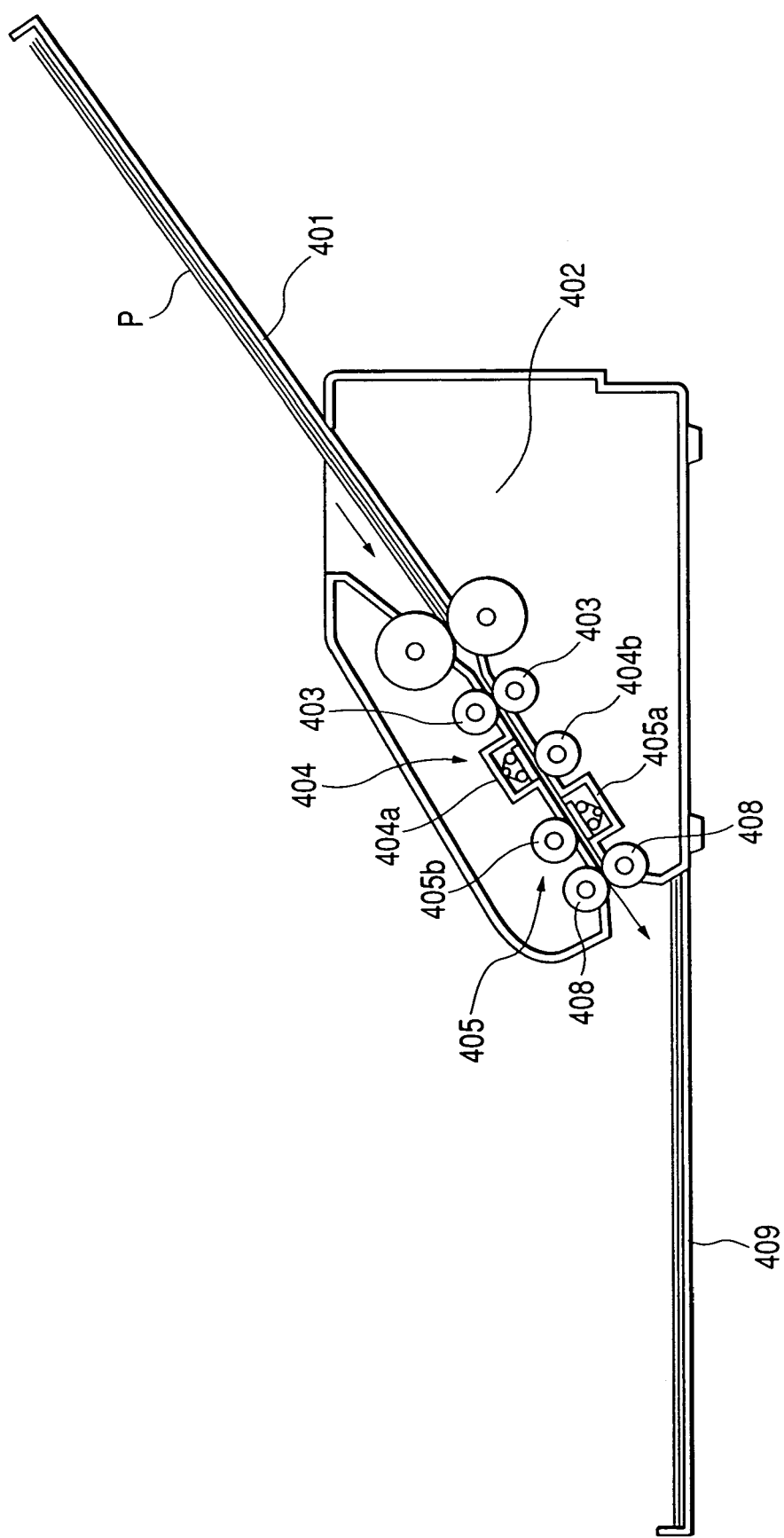
Figure 14A:
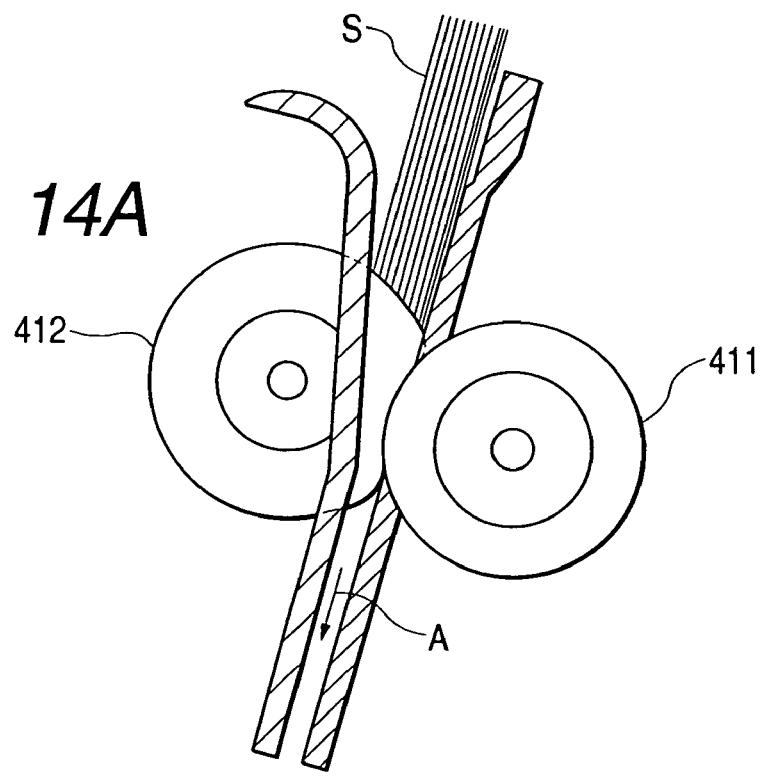
FIGS. 14A, 14B and 14C show the construction of a sheet transporting and separating apparatus according to the conventional art.
Figure 14B:
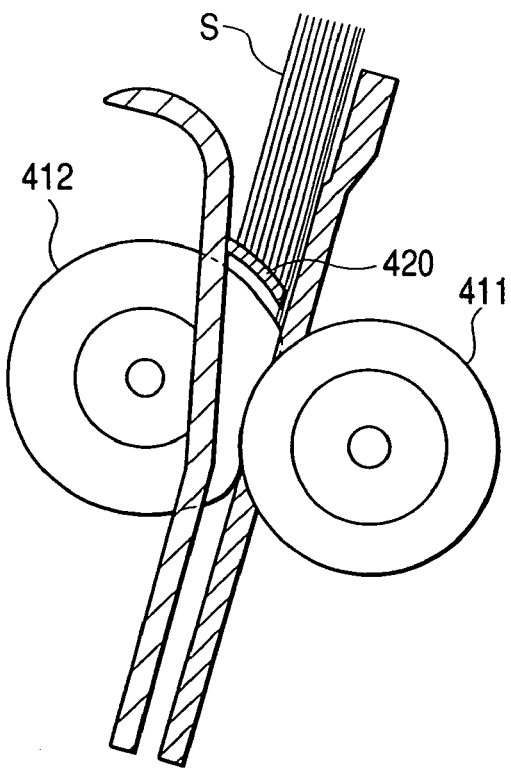
Figure 14C:
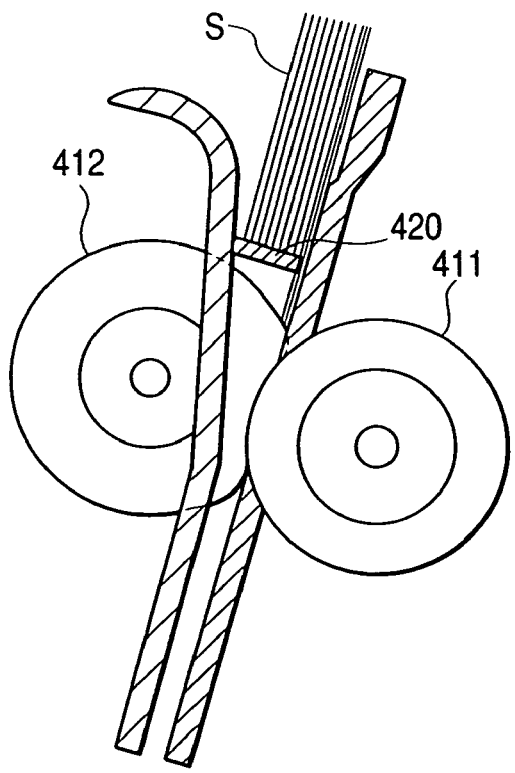

Also, in another embodiment, as shown in FIGS. 10A, 10B and 10C, the transport regulating guide 314 is formed of an elastically deformable flexible material. As shown in FIG. 10A, the tip end portion of a transport regulating tongue plate 315 is made to abut against the feed roller 311. In this case, a similar effect can also be obtained by forming the abutting surface into an uneven shape (grooves 315a) as shown in FIG. 10C.

A similar effect can also be obtained by not making the transport regulating tongue plate 315 abut against the inside of the outer diameter of the feed roller 311, but making it noncontact-enter the feed roller 311 side so as to interrupt the sheet transport, as shown in FIG. 10B.

Further, if the transport regulating guide 314 and the transport regulating tongue plate 315 are used together, a better effect will be obtained.

As described above, according to the present invention, an image reading portion is provided between a vertically extending first sheet transporting path for transporting sheets contained in an inclined sheet containing portion to the image reading portion and a substantially horizontally extending second sheet transporting path for delivering the sheets on which the images have been read to a substantially horizontal delivery stacking portion, and the transport direction of the sheet having passed the first sheet transporting path is changed to a direction toward the second sheet transporting path by the image reading portion, whereby the area occupied by the apparatus can be made small and even a thick sheet having stiffness can be transported stably.

As described above, according to the present invention, even if multiple sheets are set in the sheet transporting and separating apparatus of this kind, they can be reliably separated into one sheet and transported, to thereby eliminate the situation in which the treatment of the sheets has been stagnated by non-feed. Thereby, there can be realized an apparatus which operates smoothly and is high in reliability.

What is claimed is:

1. A sheet transporting and separating apparatus for separating a plurality of sheets from each other by means of a pair of rollers comprising a feed roller and a separation roller opposed to said feed roller and transporting the sheet, wherein said separation roller comprises an elastic member, and a transport regulating guide adapted to be relatively protruded by a deformation of the elastic member is provided in a vicinity of said separation roller.

2. A sheet transporting and separating apparatus according to claim 1, wherein said transport regulating guide is formed such that an amount of deformation of said separation roller required to protrude said transport regulating guide increases as it approaches a nip portion between said pair of rollers.

3. A sheet transporting and separating apparatus according to claim 1, wherein said transport regulating guide is formed into a shape of a staircase.

4. A sheet transporting and separating apparatus according to claim 1, wherein said transport regulating guide is formed of a flexible material, and abuts against said feed roller in a vicinity of a nip portion between said pair of rollers.

5. A sheet transporting and separating apparatus according to claim 4, wherein said transport regulating guide is formed of said flexible material, and wherein said flexible material is elastically deformable, and enters a side of said feed roller out of contact with said feed roller to interrupt a transport of the sheet in the vicinity of the nip portion between the pair of rollers.

6. A sheet transporting and separating apparatus according to claim 4, wherein a surface of said transport regulating guide which is adjacent to said feed roller has an uneven shape.

7. A sheet transporting and separating apparatus according to claim 2, wherein said transport regulating guide is formed into a shape of a staircase.

8. A sheet transporting and separating apparatus according to claim 2, wherein said transport regulating guide is formed of a flexible material, and abuts against said feed roller in a vicinity of a nip portion between said pair of rollers.

9. A sheet transporting and separating apparatus according to claim 8, wherein said transport regulating guide is formed of said flexible material, and wherein said flexible material is elastically deformable, and enters a side of said feed roller out of contact with said feed roller to interrupt a transport of the sheet in the vicinity of the nip portion between the pair of rollers.

10. A sheet transporting and separating apparatus according to claim 4, wherein a surface of said transport regulating guide which is adjacent to said feed roller has an uneven shape.

* * * * *

UNITED STATES PATENT AND TRADEMARK OFFICE
CERTIFICATE OF CORRECTION

PATENT NO.        : 7,151,621 B2
APPLICATION NO.   : 11/429075
DATED             : December 19, 2006
INVENTOR(S)       : Masahiro Shirai et al.

It is certified that error appears in the above-identified patent and that said Letters Patent is hereby corrected as shown below:

<u>COLUMN 2</u>:

Line 36, "it will" should read --will it--;

<u>COLUMN 4</u>:

Line 3, "reliable" should read --reliably--;

<u>COLUMN 5</u>:

Line 34, "about" should read --abut--;

<u>COLUMN 6</u>:

Line 22, "FIGS. 8A" should read --FIG. 8A--;

<u>COLUMN 6</u>:

Line 27, "show-an" should read --show an--;

<u>COLUMN 9</u>:

Line 4, "(driven)" should read --(drive)--;

<u>COLUMN 9</u>:

Line 5, "roller 12" should read --roller 11--;

<u>COLUMN 9</u>:

Line 6, "(driven)" should read --(drive)--;

<u>COLUMN 10</u>:

Line 62, "other" should read --another--;

<u>COLUMN 10</u>:

Line 67, "other" should read --another--;

UNITED STATES PATENT AND TRADEMARK OFFICE
CERTIFICATE OF CORRECTION

| | | |
|---|---|---|
| PATENT NO. | : 7,151,621 B2 | |
| APPLICATION NO. | : 11/429075 | |
| DATED | : December 19, 2006 | |
| INVENTOR(S) | : Masahiro Shirai et al. | |

It is certified that error appears in the above-identified patent and that said Letters Patent is hereby corrected as shown below:

COLUMN 11:

Line 56, "sensor 8a" should read --sensor 8a.--;

COLUMN 12:

Line 37, "into" should read --in--;

COLUMN 12:

Line 52, "etc." should read --etc.,--;

COLUMN 13:

Line 7, "into" should read --in--; and

COLUMN 13:

Line 13, "into" should read --in--.

Signed and Sealed this

Twentieth Day of May, 2008

JON W. DUDAS
*Director of the United States Patent and Trademark Office*